Feb. 26, 1924.
G. A. LYON
1,485,039
RESILIENT VEHICLE BUFFER
Original Filed Oct. 5, 1921
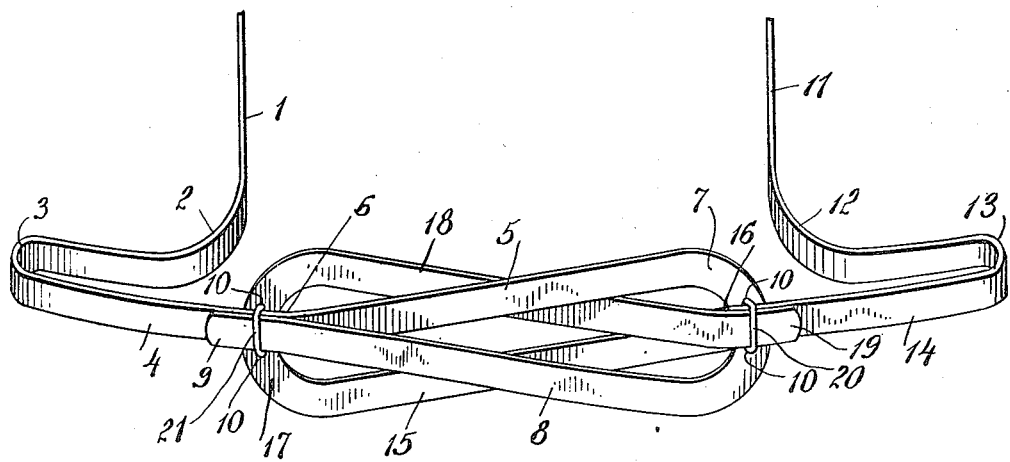
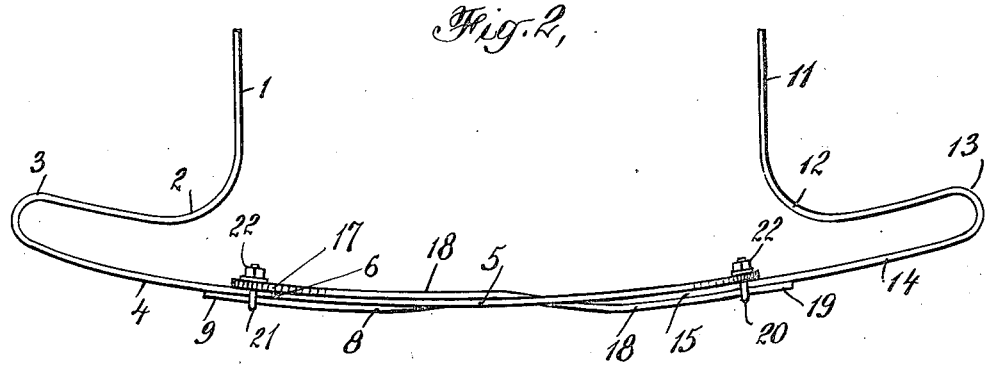
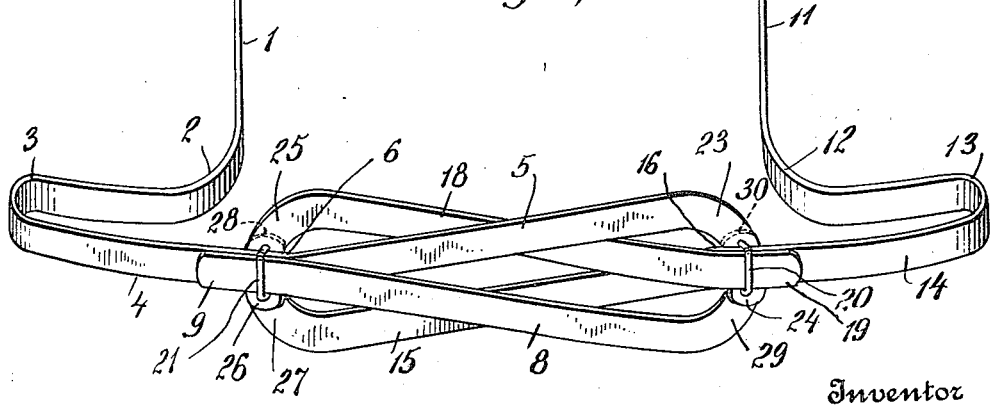
Inventor
George Albert Lyon
By his Attorney
Harry L. Duncan Patented Feb. 26, 1924.

1,485,039

UNITED STATES PATENT OFFICE.

GEORGE ALBERT LYON, OF PHILADELPHIA, PENNSYLVANIA.

RESILIENT VEHICLE BUFFER.

Application filed October 5, 1921, Serial No. 505,470. Renewed October 20, 1923.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Resilient Vehicle Buffers, of which the following is a specification taken in connection with the accompanying drawing.

This invention relates especially to resilient strip buffers or bumpers for automobiles or other vehicles in which the buffer front, which may be integrally connected with the attaching strips or members, may be formed with several intertwined loops, each of which may be of a more or less flaring character so as to increase in width from the loop shank or connector portion of the buffer front strip which may be bolted or connected to the opposing loop adjacent its wide end. In this way the central portion of the buffer front may be given a desirable increased vertical width and these vertically displaced contact portions reinforce and strengthen each other in a desirable way.

In the accompanying drawing showing in a somewhat diagrammatic way various illustrative embodiments of this invention—

Fig. 1 is a front perspective view of one illustrative buffer.

Fig. 2 is a top plan view thereof, and

Fig. 3 is a front perspective view of a modified construction.

The buffer may be advantageously formed of tempered spring steel strip or plate a quarter to three-eighths of an inch thick or so, and where steel strip is used it may be two to three inches wide more or less for ordinary automobile buffers. If desired the buffer front may be integrally or otherwise connected with attaching members which may be advantageously formed of such spring steel strip to give additional resilient yielding to the buffer front under collision conditions. As shown in Figs. 1 and 2, the attaching member 1 may be formed with the curved portion 2 and end loop 3 adapted to extend out into protective position adjacent the automobile wheel; and the inwardly extending impact receiving or front member 4 may be formed with suitable loop portions engaging or overlapping the other buffer front member which may, in some cases, also be of looped construction and adjustably connected thereto. In this case the strip may be substantially level or horizontal up to about the loop shank or connector portion 6 and may then be bent upward to form the gradually flaring or inclined loop member 5, a similarly inclined portion 8 being formed adjacent the end 9 of the strip if desired. The loop end 7 may if desired be formed by bending the strip edgewise so as to form a suitably curved or bent loop end extending substantially in front of one of the buffer attaching members or the co-operating frame member of the automobile. The other buffer strip may be of generally similar construction and may comprise the attaching member 11 extending forward into the curved portion 12 and end loop 13 so as to support the impact receiving or buffer front member 14 in which may be formed a similar edgewise bent loop end 17 and gradually flaring loop portions 15, 18 extending from the doubled loop shank connector portions 16, 19. If desired one of these strips, such as 11 may be passed through the loop end 7 of the other strip so that both the loop ends may thus be arranged behind the co-operating doubled loop shanks or connector portions of the other buffer strip or element to which they may be bolted or otherwise connected in any suitable way as by the U-bolt connectors 20, 21. The ends of these connectors may extend through holes 10 in the loop ends and be tightened by the nuts 22 so as to securely hold these parts together and hold the loop shanks in substantial vertical alignment with respect to the co-operating loop ends which they may substantially engage. The loop shanks may be substantially straight or parallel for four to six inches so that ample lateral adjustment of the buffer front elements may thus be secured to accommodate automobile frame members of different widths. This arrangement brings the central portions of the buffer front into engagement, the oppositely inclined members, 5, 18 being forced together so as to strengthen each other under collision conditions and prevent any substantial movement or rattle when the automobile is runnning.

Fig. 3 shows a generally similar construction in which each loop end may be formed of several connected strips for ease of manufacture so that, for instance, the inclined portion 5 which may be integral with the buffer front strip 4, may be bent edgewise to form the loop end portion 23 terminating in the connector portion or end 24. The other co-operating strip forming the rest of this loop may comprise the loop shank portion 9 overlapping the shank portion 6 of the other strip and connected to the inclined portion 8 which may be edgewise bent at 29 to form the rest of the loop end including an overlapping connector portion 30. Similar holes may be formed in these overlapping loop end portions to accommodate the shanks of the U-bolt or other connector such as 20, tightly securing the same to the loop shank portions 14, 19 of the other buffer element. This other buffer element or unit may be similarly formed, the front strip 14 having the downwardly inclined loop portion 15 and edgewise bent loop end portion 27 terminating in the connector portion or end 28. Another strip may have the overlapping loop shank portion 19 and inclined portion 18 bent around edgewise to form the loop end portion 25 and overlapping connector portion 26 similarly connected to the other buffer unit by the U-bolt connector 21. These buffers are strong and rigid and besides having the desirable wide or high contact face adjacent the central portion of the buffer, have a pleasing appearance due to these intertwined front loops which, of course, may be given different shapes and proportions if desired.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims:

1. The automobile buffer comprising two buffer units of resilient spring steel strip each comprising an attaching member connected end loop and buffer front member having doubled overlapping loop shank connector portions substantially in front of the attaching member and having a gradually flaring edgewise bent buffer front loop extending across the buffer front and having its loop end substantially in front of the opposite attaching member, one of said buffer units being inserted into the loop of the other and U-bolt connectors extending through said loop ends to securely and adjustably connect thereto the co-operating loop shank connector portions arranged in front of said loop ends.

2. The automobile buffer comprising two buffer units of resilient spring steel strip each comprising an attaching member connected end loop and buffer front member having doubled overlapping loop shank connector portions substantially in front of the attaching member and having a buffer front loop extending across the buffer front and having its loop end substantially in front of the opposite attaching member, one of said buffer units being inserted into the loop of the other and connectors to securely and adjustably connect thereto the co-operating loop shank connector portions arranged in front of said loop ends.

3. The automobile buffer having attaching members and a connected buffer front comprising spring strip units each having overlapping loop shank connector portions substantially in front of the attaching member and having a gradually flaring edgewise bent buffer front loop extending across the buffer front and having its loop end substantially in front of the opposite attaching member, one of said units being inserted into the loop of the other and connectors securely and adjustably connecting said loop ends to the co-operating loop shank connector portions arranged adjacent said loop ends.

4. The automobile buffer having attaching members and a connected buffer front comprising spring strip units each having loop shank connector portions substantially in front of the attaching member and having a flaring edgewise bent buffer front loop extending across the buffer front and having its loop end substantially in front of the opposite attaching member, and connectors connecting said loop ends to co-operating loop shank connector portions arranged adjacent said loop ends.

5. The automobile buffer front comprising a plurality of units of resilient spring steel strip forming overlapping loop shank connector portions and edgewise bent buffer front loops of considerably vertical extent each extending across the buffer front and each having its loop end substantially in line with the opposite loop shank connector portion and connectors rigidly connecting said units.

6. The automobile buffer front comprising a plurality of units of resilient spring steel forming loop shank connector portions and edgewise bent buffer front loops of considerable vertical extent each extending across the buffer front and connectors rigidly connecting said units.

7. The automobile buffer front comprising two units of resilient spring steel strip each having adjacent its central portion overlapping loop shank connector portions substantially in front of the attaching member and having edgewise bent buffer front loop having its loop end substantially in front of the opposite attaching member, and U-bolt connectors extending through said loop ends and enclosing said loop shank connector portions to securely and adjustably connect thereto the co-operating loop ends.

8. The automobile buffer front comprising two units of resilient spring steel strip each having adjacent its central portion overlapping loop shank connector portions and having an edgewise bent buffer front loop and connectors engaging said loop ends and enclosing said loop shank connector portions to securely and adjustably connect thereto the co-operating loop ends.

GEORGE ALBERT LYON.